(12) United States Patent
Tanaka et al.

(10) Patent No.: US 7,651,548 B2
(45) Date of Patent: Jan. 26, 2010

(54) DISCHARGE DEVICE AND AIR PURIFICATION DEVICE

(75) Inventors: Toshio Tanaka, Osaka (JP); Kenkichi Kagawa, Osaka (JP); Kanji Motegi, Osaka (JP)

(73) Assignee: Daikin Industries, Ltd., Osaka-shi (JP)

(*) Notice: Subject to any disclaimer, the term of this patent is extended or adjusted under 35 U.S.C. 154(b) by 537 days.

(21) Appl. No.: 10/588,455

(22) PCT Filed: Feb. 7, 2005

(86) PCT No.: PCT/JP2005/001783

§ 371 (c)(1),
(2), (4) Date: Aug. 4, 2006

(87) PCT Pub. No.: WO2005/076424

PCT Pub. Date: Aug. 18, 2005

(65) Prior Publication Data

US 2008/0314251 A1    Dec. 25, 2008

(30) Foreign Application Priority Data

Feb. 9, 2004    (JP)    ............... 2004-032006

(51) Int. Cl.
*B03C 3/68* (2006.01)
(52) U.S. Cl. .................. 95/7; 95/80; 95/81; 96/24; 96/80; 323/903
(58) Field of Classification Search ............. 96/18–24, 96/80–82; 95/2–7, 80, 81; 323/903
See application file for complete search history.

(56) References Cited

U.S. PATENT DOCUMENTS

| | | | | | |
|---|---|---|---|---|---|
| 1,934,923 | A | * | 11/1933 | Heinrich | 95/81 |
| 2,280,330 | A | * | 4/1942 | White | 96/82 |
| 3,984,215 | A | * | 10/1976 | Zucker | 95/81 |
| 4,587,475 | A | * | 5/1986 | Finney et al. | 323/241 |
| 4,713,093 | A | * | 12/1987 | Hansson | 96/82 |
| 4,726,812 | A | * | 2/1988 | Hirth | 95/80 |
| 4,772,998 | A | * | 9/1988 | Guenther, et al. | 363/128 |
| 4,976,749 | A | * | 12/1990 | Adamski et al. | 95/63 |
| 5,061,296 | A | * | 10/1991 | Sengpiel et al. | 95/7 |
| 5,159,544 | A | * | 10/1992 | Hughey et al. | 363/97 |
| 5,255,178 | A | * | 10/1993 | Liberati | 96/80 |
| 5,401,299 | A | * | 3/1995 | Kroeger et al. | 96/23 |
| 5,601,633 | A | * | 2/1997 | Ponizovsky et al. | 95/81 |
| 5,639,294 | A | * | 6/1997 | Ranstad | 95/6 |
| 5,707,422 | A | * | 1/1998 | Jacobsson et al. | 95/6 |
| 5,972,076 | A | * | 10/1999 | Nichols et al. | 95/81 |
| 6,611,440 | B1 | * | 8/2003 | Johnston et al. | 363/44 |

(Continued)

FOREIGN PATENT DOCUMENTS

EP    208822 A1 *    1/1987    ............... 96/82

(Continued)

*Primary Examiner*—Richard L Chiesa
(74) *Attorney, Agent, or Firm*—Birch, Stewart, Kolasch & Birch, LLP.

(57) ABSTRACT

The frequency of a cyclically varying voltage, (fv), is made equal to or higher than the frequency of a streamer discharge, (fs), thereby making it possible to reduce the discharge delay time which is caused in a single streamer discharge.

5 Claims, 8 Drawing Sheets

U.S. PATENT DOCUMENTS

| | | | |
|---|---|---|---|
| 7,041,157 B1 * | 5/2006 | Fleck | 95/273 |
| 7,270,698 B2 * | 9/2007 | Tanaka et al. | 96/95 |
| 7,332,020 B2 * | 2/2008 | Tanaka et al. | 96/66 |
| 7,377,962 B2 * | 5/2008 | Tanaka et al. | 96/83 |
| 7,465,339 B2 * | 12/2008 | Tanaka et al. | 96/52 |
| 7,497,893 B2 * | 3/2009 | Krichtafovitch | 95/2 |
| 2005/0061152 A1 * | 3/2005 | Liu | 96/80 |
| 2007/0193448 A1 * | 8/2007 | Tanaka et al. | 96/18 |

FOREIGN PATENT DOCUMENTS

| | | | |
|---|---|---|---|
| EP | 508961 A1 * | 10/1992 | 96/80 |
| JP | 2000-58290 A | 2/2000 | |
| JP | 2002-336689 A | 11/2002 | |
| JP | 2003-53129 A | 2/2003 | |
| WO | WO-97/35666 A1 | 10/1997 | |
| WO | WO-98/42444 A1 | 10/1998 | |
| WO | WO-99/12649 A1 | 3/1999 | |

* cited by examiner

FIG. 10 "CONVENTIONAL ART"
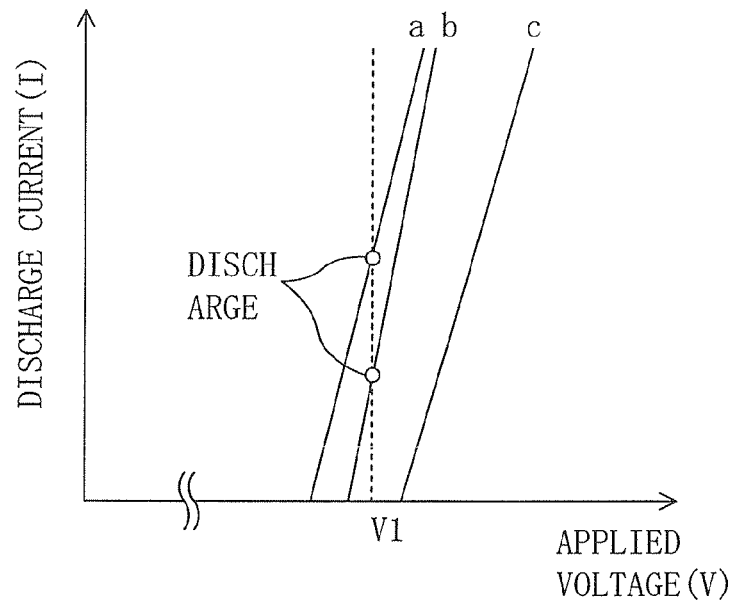
FIG. 11 "CONVENTIONAL ART"
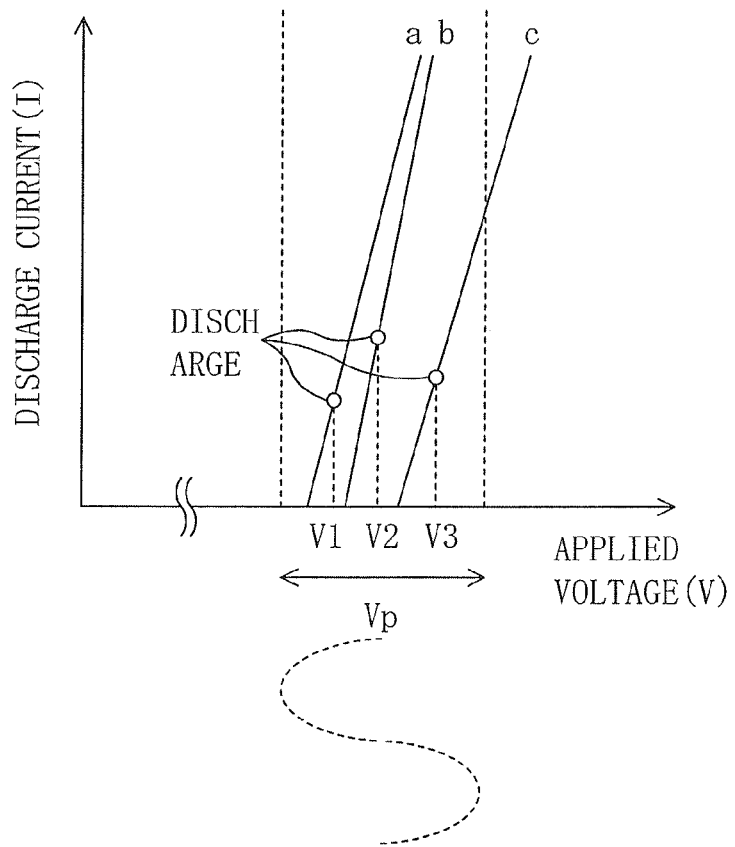

DISCHARGE DEVICE AND AIR PURIFICATION DEVICE

This is a National phase of PCT International Application No. PCT/JP2005/001783, filed on Feb. 7, 2005 under 35 U.S.C. § 371. The entire contents of each of the above-identified applications are hereby incorporated by reference.

TECHNICAL FIELD

The present invention relates to a discharge device which causes a streamer discharge to be initiated upon application of a cyclically varying voltage, and to an air purification device which is equipped with such a discharge device.

TECHNICAL FIELD

Air purification devices which are equipped with discharge devices are conventionally utilized as means for decomposing and removing, by the use of a plasma generated by electric discharge, odorous components, harmful components, and other substances. Among these various air purification devices, an air purification device of the streamer discharge type in which a low temperature plasma is generated by streamer discharge is a preferable technique for decomposing and deodorizing harmful components because of its high air purification efficiency with relatively less electric power consumption.

The above streamer discharge type air purification device includes, as a discharge device, a plurality of discharge electrodes, a counter electrode facing the plurality of discharge electrodes, and an electric power supply means configured to apply a voltage to both the discharge and counter electrodes. In this arrangement, upon application of a voltage to both the electrodes from the electric power supply means, a streamer discharge is produced between both the electrodes, thereby generating a low temperature plasma. Harmful components and odorous components contained in air to be treated are brought into aeration contact with activated species (fast electron, ion, radical, other excited molecule et cetera) produced as a result of generation of the low temperature plasma, whereby these components are decomposed and removed (see Patent Document I).

Such a streamer discharge type discharge device provides high decomposition efficiency for odorous components and harmful components, but on the other hand it has the property that the streamer discharge state (e.g. the frequency of occurrence of streamer discharges and the streamer discharge generation status) is acutely susceptible to being easily influenced by various affectors. If, in consequence of either dimensional or assembly errors made during fabrication of discharge electrodes, or dust adhesion between electrodes, the electrodes vary from each other in discharge characteristic, there arises a problem that streamer discharges are not produced stably.

The above is described with reference to FIG. 10. FIG. 10 graphically represents discharge characteristics exhibited, respectively, by a plurality of electrodes (a, b, c), wherein the abscissa axis is indicative of the applied voltage (V) which is impressed to the plurality of electrodes and the ordinate axis is indicative of the discharge current (I) which flows at the time of electric discharge. And these electrodes (a, b, c) vary from each other in discharge characteristic because of the reason described above. If, in such a condition, a predetermined applied voltage (for example, V1 of FIG. 10) is fed to each electrode, this may result in a state in which some electrode (for example, the electrode (c) of FIG. 10) is not fed a voltage required for electric discharge, and no streamer discharge is produced. If, in this way, no streamer discharge is produced in a certain electrode, this reduces the amount of generation of activated species (fast electron, radical et cetera), thereby producing the problem that the air purification device equipped with a discharge device of the type described above is reduced in air purification efficiency.

As a conventional technique for providing solutions to the above problem, there is a discharge device in which a cyclically varying voltage is applied to both the electrodes from an electric power supply means. As shown in FIG. 11, in this discharge device, an applied voltage (for example, Vp of FIG. 11) is made to undergo cyclical variation, thereby allowing the electrodes to be capable of producing streamer discharges at their respective predetermined voltages (for example, V1, V2, V3 of FIG. 11), whereby the above-mentioned problem (discharge characteristic variation) is eliminated (see Patent Document II).

Patent Document I: JP 2002-336689A

Patent Document II: JP 2003-53129A

DISCLOSURE OF THE INVENTION

Problems that the Invention Intends to Solve

Incidentally, in the discharge devices disclosed in Patent Documents I and II, pulsing streamer discharges are generated. This is described with reference to FIG. 5. With reference to FIGS. 5(A)-5(C), the concept of how an electron (51) and a charged particle (52) which is a plus ion migrate is illustrated in stages.

At the time of streamer discharge, a leader (53) which is a minute arc is generated from a discharge electrode (41) towards a counter electrode (42). At the tip of the leader (53), air is ionized into an electron (51) and a charged particle (52) by a strong electric potential gradient. And when the charged particle (52) reaches the counter electrode's (42) side, a single electric discharge is completed.

In this case, the electron (51) resulting from ionization moves in the direction of the discharge electrode (41), while on the other hand the charged particle (52) moves in the direction of the counter electrode (42) (FIG. 5(A)). Here, the charged particle (52) as a result of ionization is relatively large in mass, in comparison with the electron (51). Consequently, the charged particle (52) is slower in movement speed than the electron (51), which means that in a single streamer discharge the charged particle (52) is temporarily left behind between both the electrodes (41, 42) (FIG. 5(B)). When this lingering charged particle (52) completes a migration to the counter electrode (42), the electric field becomes normal again between the electrodes (41, 42), and another electric discharge commences (FIG. 5(C)). As described above, at the time of streamer discharge, a cycle of (A)→(B)→(C) is repeatedly carried out, and by virtue of intermittent migration of the charged particle (52), a streamer discharge is generated in the form of a pulse.

During such a streamer discharge, the discharge device of Patent Document II, in which a cyclically varying voltage is applied, will suffer the following problems.

FIG. 6 is a graph which represents the temporal variation in occurrence characteristic of the streamer discharge in a discharge device in which a cyclically varying voltage (Vp) is applied. In the graph, the abscissa axis is indicative of the time (t) and the ordinate axis is indicative of the applied voltage (V). In addition, the discharge electrode has a characteristic of causing a streamer discharge to be initiated upon application of a voltage equal to or higher than, for example, (Vmin).

In this condition, when the cyclically varying voltage (Vp) becomes equal to or higher than (Vmin) at, for example, time t1, a first streamer discharge is initiated. At the time of this streamer discharge, it takes time for the charged particle (52) to reach the counter electrode (42) because of the charged particle (52) left behind between the electrodes. This necessitates a predetermined discharge cycle (Ts) during the time from initiation of a streamer discharge until initiation of the next streamer discharge. Here, in the case where a cyclically varying voltage is applied to both the electrodes (41, 42), the voltage (Vp) may not exceed (Vmin) after an elapse of the discharge cycle (Ts) (for example, at time t2 of FIG. 6). In this case, the next streamer discharge is not provided at time t2, but at time t3 at which the voltage (Vp) reaches above (Vmin) for the first time after an elapse of the discharge cycle (Ts). To sum up, the time from t2 until t3 (a period of time indicated by dashed arrow of FIG. 6) becomes a discharge delay time, thereby causing discharge losses in the electrodes (41, 42). In order to stably provide a streamer discharge to thereby exert its high air purification efficiency, it is highly desirable that the discharge losses due to the aforesaid discharge delay time are made to be suppressed as low as possible.

With a view to providing solutions to the above-described problems, the present invention was devised. Accordingly, an object of the present invention is to provide an improved discharge device in which a cyclically varying voltage is applied. More specifically, the present invention intends to accomplish a reduction in discharge loss between both the electrodes, thereby making it possible to stably produce streamer discharges.

Means for Solving the Problems

In the present invention, by the speeding up of the frequency of a voltage that is applied to both a discharge electrode and a counter electrode, it becomes possible to reduce the discharge losses of a discharge device.

More specifically, a first invention provides a discharge device, which comprises a plurality of discharge electrodes and a counter electrode facing the plurality of discharge electrodes, for causing a streamer discharge to be initiated between both the electrodes by applying a cyclically varying voltage to both the electrodes from an electric power supply means. And the discharge device of the first invention is characterized in that the following relational expression is satisfied:

$$fv \geq fs$$

where (fv) is the frequency of the voltage which is applied to both the electrodes and (fs) is the frequency of the streamer discharge which is generated, in the form of a pulse, between both the electrodes. Here, what is meant by "streamer discharge frequency (fs)" is the frequency of a streamer discharge that is generated in the form of a pulse by the lingering charged particle (52) (see FIG. 6), in other words the streamer discharge frequency (fs) means the reciprocal of the foregoing discharge cycle (Ts).

In the first invention, the cyclically varying voltage frequency (fv) becomes equal to or higher than the streamer discharge frequency (fs) and is then applied from the electric power supply means (45) to both the electrodes (41, 42). In other words, as shown in FIG. 7, the cycle of the cyclically varying voltage (the voltage cycle (Tv)) becomes equal to or lower than the discharge cycle (Ts). If, in such a condition, a streamer discharge is produced, this makes it possible to further reduce the discharge delay time at the time of streamer discharge (period indicated by dashed arrow in FIG. 7), as compared to the case where the voltage cycle (Tv) is in excess of the discharge cycle (Ts).

A second invention provides a discharge device according to the first invention, the second invention being characterized in that if k=40 [mm/kHz] the following relational expression is satisfied:

$$fv \geq k/G$$

where (fv)[kHz] is the frequency of the voltage which is applied to both the electrodes and (G)[mm] is the distance between both the electrodes.

In the second invention, the voltage frequency (fv) which becomes equal to or higher than the discharge frequency (fs) is determined based on the distance (G) (gap length) between both the electrodes, and a voltage having this voltage frequency (fv) is applied by the electric power supply means (45) to both the electrodes (41, 42).

The above is described with reference to FIG. 5. A streamer discharge is generated in the form of a pulse due to the lingering charged particle (52). Consequently, the lingering time of the charged particle (52) decreases with decreasing the distance for the charged particle (52) to reach the counter electrode (42), i.e. the gap length (G), and the discharge frequency (fs) increases. On the other hand, the lingering time of the charged particle (52) increases with increasing the gap length (G), and the discharge frequency (fs) decreases. In this way, the streamer discharge frequency (fs) is strongly governed by the gap length (G), and the discharge frequency (fs) can be roughly estimated from the gap length (G).

In the present invention, the discharge frequency (fs) at the time of streamer discharge is estimated from the gap length (G) (from the experimentally found relational expression: fs=k/G (k=40 [mm/kHz])), and the voltage frequency (fv) is determined based on the estimated discharge frequency (fs). This ensures without failing that the voltage frequency (fv) is made equal to or higher than the discharge frequency (fs), thereby making it possible to positively reduce the discharge delay time at the time of streamer discharge.

A third invention provides a discharge device according to the first or second invention, the third invention being characterized in that the following relational expression is satisfied:

$$fv \geq 20 [kHz]$$

where (fv)[kHz] is the frequency of the voltage which is applied to both the electrodes.

In the third invention, a voltage is applied from the electric power supply means (45) to both the electrodes (41, 42) at the voltage frequency (fv) not less than the discharge frequency (fs) and not less than 20[kHz]. Generally, the streamer discharge frequency (fs) is less than 20[kHz], so that if the voltage frequency (fv) is made equal to or higher than 20[kHz], this ensures that the voltage frequency (fv) is not less than the discharge frequency (fs) without failing. Accordingly, the discharge delay time (period indicated by dashed arrow in FIG. 6) at the time of streamer discharge can be reduced.

A fourth invention provides a discharge device according to one of the first to third inventions, the fourth invention being characterized in that the following relational expression is satisfied:

$$Vp\text{-}p \leq 0.1 \times Va$$

where (Va) and (Vp-p) are, respectively, the average voltage and the amplitude for the voltage which is applied to both the electrodes.

In the fourth invention, a voltage that cyclically varies at the amplitude (Vp-p) equal to or lower than 10% of the average voltage (Va) is applied by the electric power supply means (45) to both the voltages (41, 42). Consequently, the range of variation of the voltage that is applied to both the electrodes (41, 42) is made equal to or lower than 10% of the average voltage (Va). Here, the streamer discharge has such a characteristic that sparks are produced more easily when compared to the electric discharge such as electric precipitation. For this reason, in the case where the amplitude (Vp-p) is great relative to the average voltage (Va) of the voltage that is applied, if the voltage that is applied to both the electrodes (41, 42) increases to reach a spark region, this may result in generating a spark between both the electrodes (41, 42).

On the other hand, in the present invention, the range of variation of the voltage that is applied to both the electrodes (41, 42) is narrowed so as to fall below 10% of the average voltage (Va), thereby keeping the voltage that is applied to both the electrodes (41, 42) from increasing and reaching a spark region, whereby the generation of a spark is inhibited.

A fifth invention provides an air purification device, which comprises a discharge device for causing a streamer discharged to be initiated between a discharge electrode and a counter electrode, for purifying air to be treated by distributing the air to be treated between both the electrodes. And the fifth invention is characterized in that the aforesaid discharge device is any one of the discharge devices according to the first to fourth inventions.

The fifth invention provides an air purifying device to which the discharge device according to any one of the first to fourth inventions is applied. Therefore, the discharge delay time at the time of streamer discharge in the air purification device can be reduced.

EFFECTS OF THE INVENTION

In accordance with the first invention, it is arranged such that a voltage whose voltage frequency (fv) is equal to or higher than the discharge frequency (fs) is applied to both the electrodes (41, 42). In addition, in each of the electrodes (41, 42), the discharge delay time caused at the time of streamer discharge is reduced. Consequently, the discharge loss is suppressed in both the electrodes (41, 42), thereby making it possible to stably generate streamer discharges.

In accordance with the second invention, it is arranged such that the voltage frequency (fv) is determined based on the discharge frequency (fs) estimated from the gap length (G). This arrangement ensures that the voltage frequency (fv) is made equal to or higher than the discharge frequency (fs), thereby making it possible to reduce the discharge delay time at the time of streamer discharge. This therefore ensures that the discharge losses of the discharge device are suppressed without failing.

In accordance with the third invention, it is arranged such that a voltage, whose voltage frequency (fv) is not less than the discharge frequency (fs) and not less than 20[kHz], is applied. Consequently, the voltage frequency (fv) is made equal to or higher than the discharge frequency of a general streamer discharge (less than about 20 [kHz]), thereby making it possible to reduce the discharge delay time at the time of streamer discharge.

In addition, if the frequency of a voltage, (fv), is made equal to or higher than 20[kHz], this allows the frequency of sound associated with the outputting of the voltage to become higher than the range of human hearing, thereby making it possible to suppress noises generated in the vicinity of the electric power supply means (45).

In accordance with the fourth invention, it is arranged such that the amplitude (Vp-p) of the cyclically varying voltage is made equal to or lower than 10% of the average voltage (Va). This arrangement narrows the range of variation of the voltage that is applied to both the electrodes (41, 42), thereby making it possible to prevent the voltage that is applied to both the electrodes (41, 42) from reaching a spark region. As a result, the generation of a spark is inhibited and the streamer discharge stability of the discharge device is improved.

In accordance with the fifth invention, by incorporating a discharge device according to any one of the first to fourth inventions into an air purification device, it becomes possible to reduce the discharge delay time at the time of streamer discharge in the air purification device. This reduces the discharge losses of the air purification device, thereby making it possible to stably generate streamer discharges. Accordingly, the air purification efficiency of the air purification device can be improved.

BRIEF DESCRIPTION OF THE DRAWINGS

FIG. 10 is a diagram which provides a description of the discharge characteristic of a conventional discharge device; and FIG. 11 is a diagram which provides a description of the discharge characteristic when a cyclically varying voltage is applied.

REFERENCE NUMERALS/SIGNS IN DRAWINGS

(10) air purification device
(40) discharge device
(41) discharge electrode
(42) counter electrode
(45) electric power supply means
(fv) voltage frequency
(fs) discharge frequency
(Tv) voltage cycle
(Ts) discharge cycle

BEST MODE FOR CARRYING OUT THE INVENTION

An embodiment of the present invention is described with reference to FIGS. 1-4.

Figure 1:
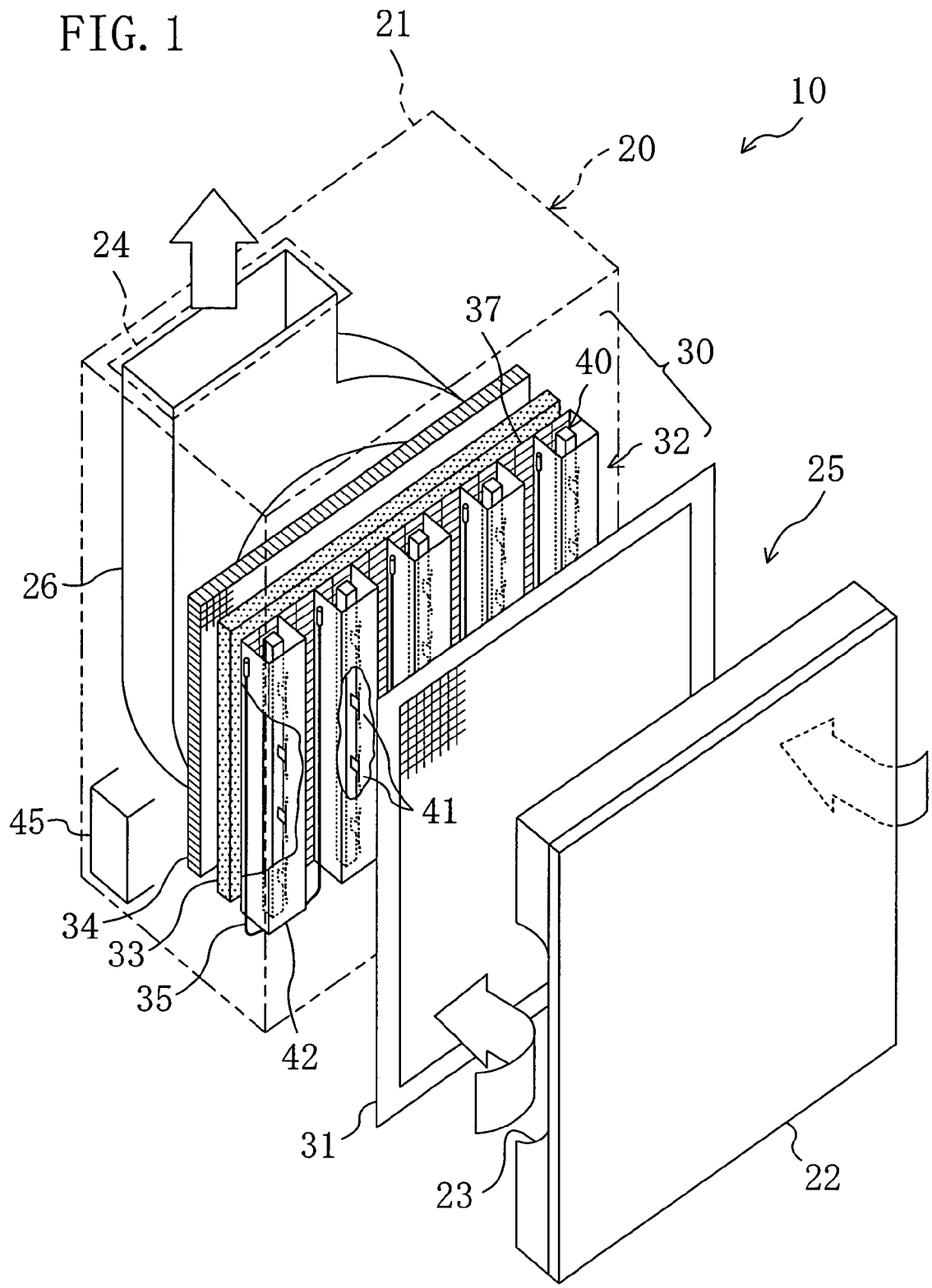
FIG. 1 is a schematic perspective view which illustrates the overall construction of an air purification device according to an embodiment of the present invention.
Figure 2:
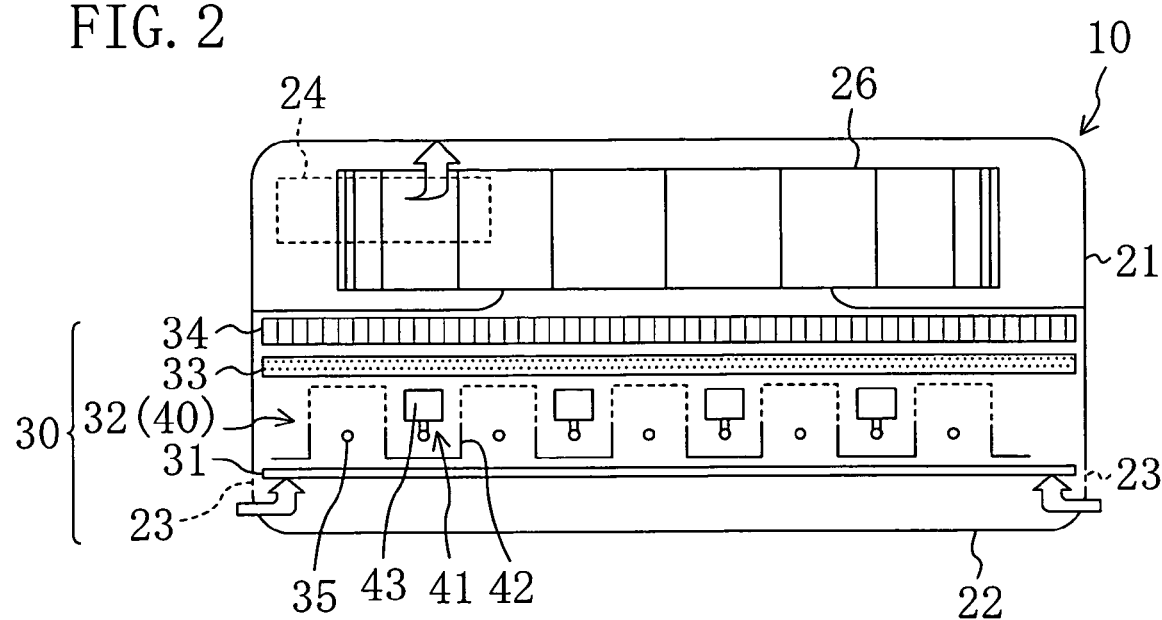
FIG. 2 is a constructional diagram which illustrates the inside of a discharge device according to the embodiment when viewed from above.

FIG. 1 is a perspective view which illustrates in exploded manner an air purification device (10) according to the present embodiment and FIG. 2 is a diagram which shows the inside of the air purification device (10) when viewed from above. This air purification device (10) is a consumer air purification device intended for use in general household and small stores. In addition, the air purification device (10) is an air purification device of the so-called streamer discharge type adapted to generate a low temperature plasma by streamer discharge and purify air to be treated with the aid of the low temperature plasma.

The air purification device (10) includes a casing (20). The casing (20) is made up of a box-like casing main body (21) with an open end surface and a front plate (22) which is placed on the open end surface. An air suction opening (23) is formed in each side surface of the casing (20) on the side of the front plate (22). In addition, an air blowout opening (24) is formed in the top plate of the casing main body (21). More specifically, the air blowout opening (24) is located adjacent to the rear plate of the casing main body (21).

An air passageway (25) is formed within the casing (20). The air passageway (25) extends from the air suction opening (23) to the air blowout opening (24). A stream of room air which is the air to be treated is made to flow through the air passageway (25). A functional section (30) including various air purification components, and a centrifugal air blower (26) configured to cause room air to be distributed through the air passageway (25) are disposed in the air passageway (25) in that order in the direction from the upstream side (the bottomside in FIG. 2) to the downstream side of the flow of the room air.

Disposed, in sequence from the side of the front plate (22), in the functional section (30) are a pre-filter (31), an ionization part (32), an electrostatic filter (33), and a catalytic filter (34). A discharge device (40) configured to cause a low temperature plasma to be generated is integrally incorporated into the ionization part (32). In addition, an electric power supply means (45) for the discharge device (40) is provided in the casing main body (21) of the air purification device (10). More specifically, the electric power supply means (45) is located adjacent to the rear bottomside of the casing main body (21).

The pre-filter (31) is formed by a filter adapted to entrap and collect dust of relatively large size contained in the air. The ionization part (32) causes dust of relatively small size passing through the pre-filter (31) to be charged electrically. The electrically charged dust is entrapped and collected by the electrostatic filter (33) disposed downstream of the ionization part (32). The ionization part (32) is made up of a plurality of ionization lines (35) and a plurality of counter electrodes (42). The plurality of ionization lines (35) extend between the top end and the bottom end of the ionization part (32) at even intervals. Each ionization line (35) lies on a single virtual surface in parallel with the electrostatic filter (33). The counter electrode (42) is formed by an elongated member having a cross section in the shape of a Japanese katakana character "コ(ko)" (like a rectangular shape with one side missing or open), and its open part is located on the rear side. Each counter electrode (42) is arranged between ionization lines (35), such that it is positioned parallel to the ionization lines (35). And, each counter electrode (42) is joined, at its open part, to a single mesh plate (37).

The discharge device (40) is equipped with a plurality of discharge electrodes (41) and a counter electrode (42) facing the discharge electrodes (41). This counter electrode (42) is shared as the counter electrode (42) of the ionization part (32), and the discharge electrodes (41) are positioned in the inside of the associated counter electrode (42) facing the discharge electrodes (41).

Figure 3:
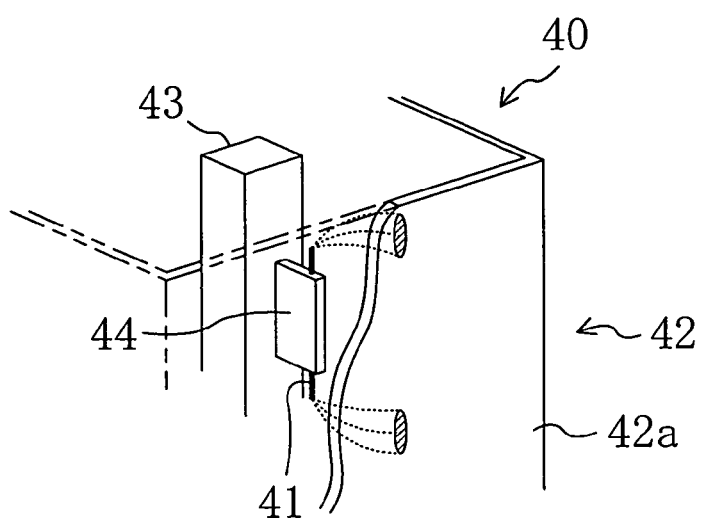
FIG. 3 is a perspective view which illustrates in enlarged manner a main section of the discharge device of the embodiment.

More specifically, with reference to FIG. 3 which is an enlarged perspective view of the discharge device (40), an electrode holding member (43) extending vertically is provided in the inside of the counter electrode (42). The discharge electrode (41) is held by a fixing member (44) to the electrode holding member (43). The discharge electrode (41) is a linear or rod-like electrode. The discharge electrode (41) projecting outwardly from the fixing member (44) is arranged, such that it runs substantially parallel with a first surface (42a) of the counter electrode (42). In addition, the distance between the tip of the discharge electrode (41) and the first surface (42a) of the counter electrode (42), i.e. the gap length (G), is 4.8 [mm] in the present embodiment.

The catalytic filter (34) is disposed downstream of the electrostatic filter (33). The catalytic filter (34) is formed, for example, by a honeycomb structure substrate which supports on its surface a catalyst. As the catalyst, catalysts (such as catalysts of the manganese family and catalysts of the precious metal family) may be used. These catalysts are capable of further activating high-reactivity substances present in a low temperature plasma generated by electric discharge and capable of promoting the decomposition of harmful substances and odorous substances in the air.

Figure 4:
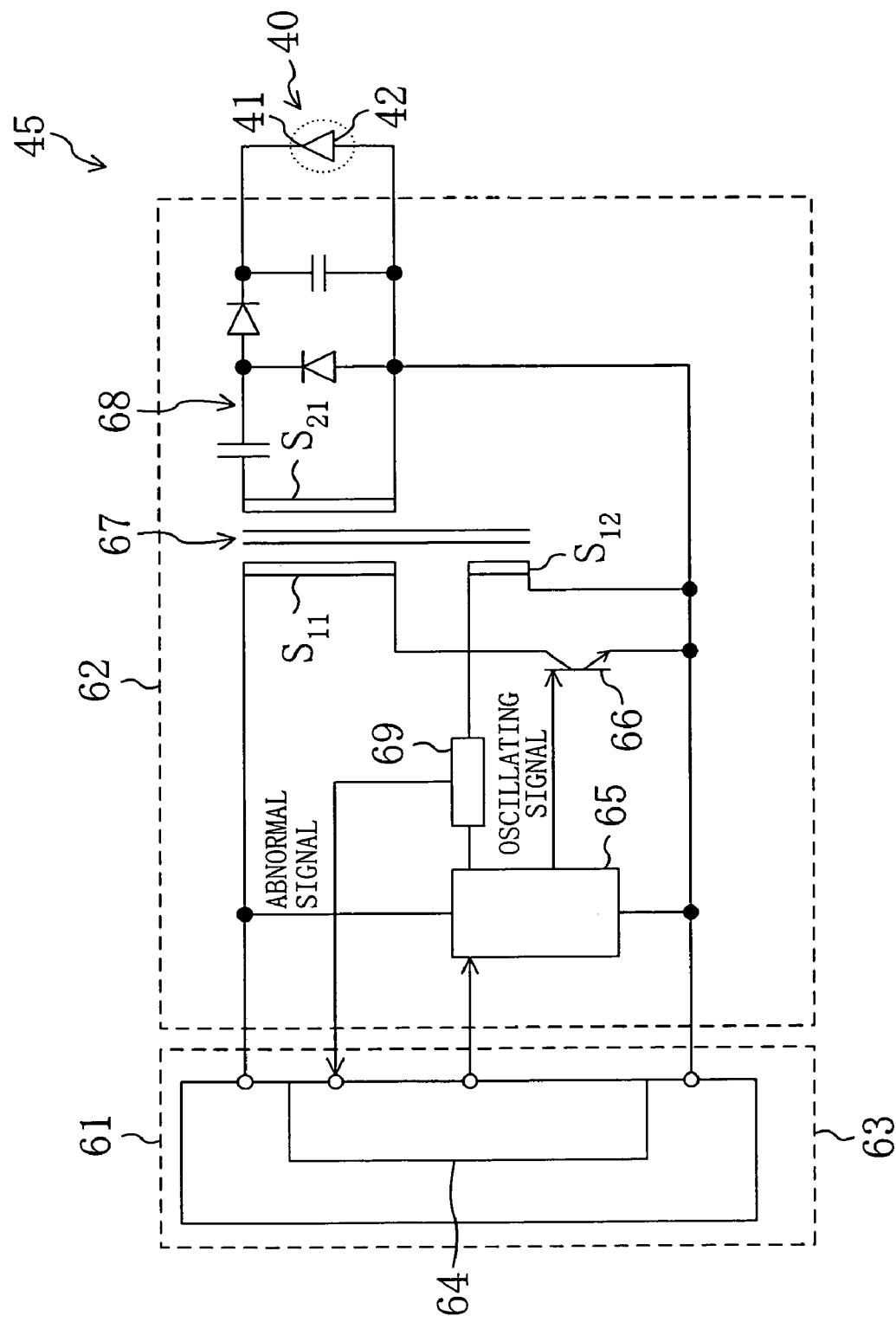
FIG. 4 is a circuit diagram for an electric power supply means of the embodiment.
Figure 5:
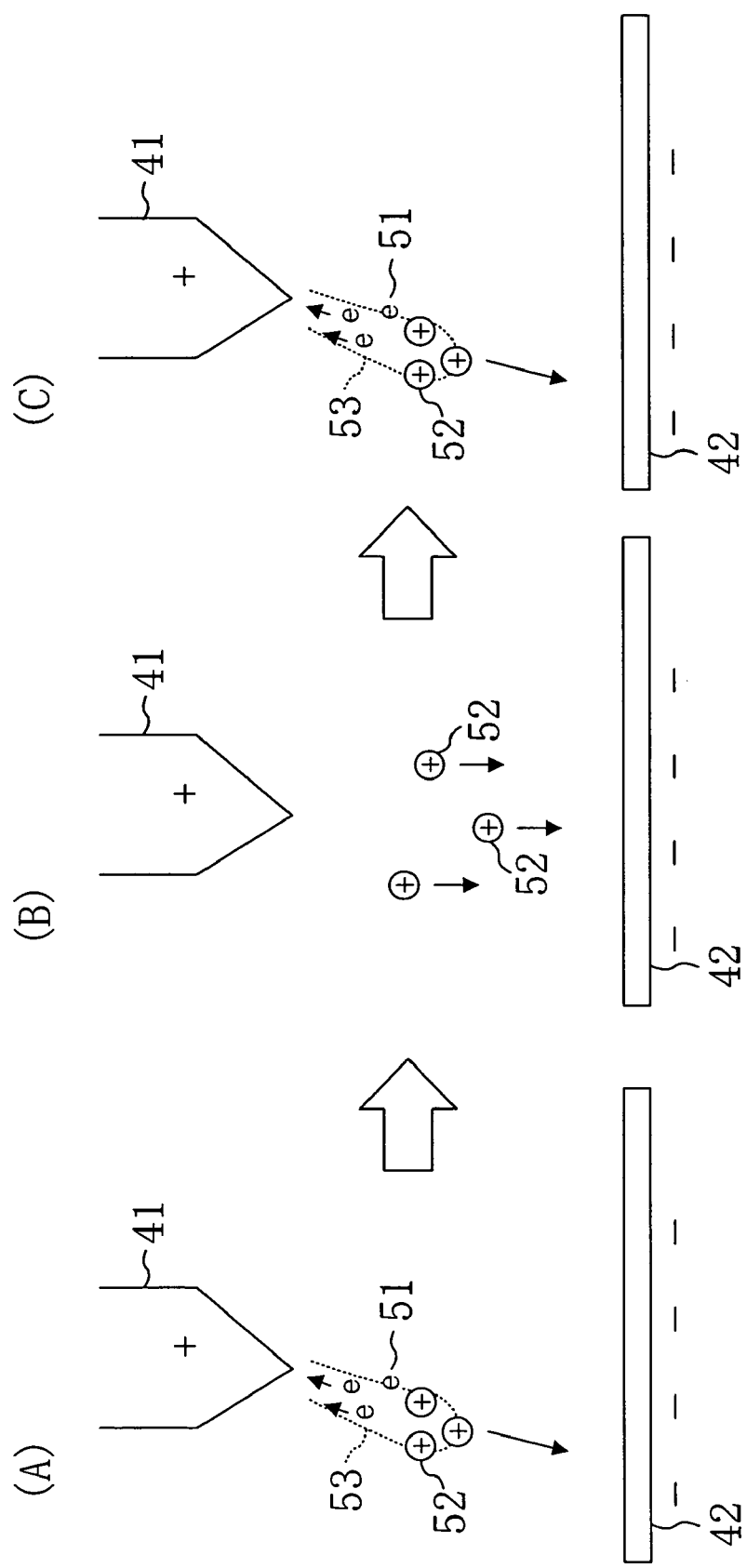
FIG. 5 is a diagram which provides a description of the principle of streamer discharge.

In the following, with reference to FIG. 4, a circuitry example of the electric power supply means (45) as a feature of the present invention is described. The electric power supply means (45) is made up of a high voltage power supply control part (61) and a high voltage power supply circuit part (62). The high voltage power supply control part (61) and the high voltage power supply circuit part (62) are connected together. In addition, the high voltage power supply circuit part (62) is connected to the discharge electrode (41) and to the counter electrode (42).

The high voltage power supply control part (61) includes a high voltage power supply (63) which is a primary side power supply, and a controller (64) for controlling the high voltage power supply circuit part (62).

The high voltage power supply circuit part (62) includes an oscillating circuit (65), a transistor (66), a transformer part (67), and a smoothing circuit (68).

The oscillating circuit (65) applies a voltage (oscillating signal) to the transistor (66) whereby the transistor (66) is turned on or off. In addition, in response to the on/off of the transistor (66), the transformer part (67) applies a cyclically varying voltage to the smoothing circuit (68). The transformer part (67) has, on the primary side (oscillating circuit side), a primary side first coil (S11) and a primary side second coil (S12). In addition, the transformer part (67) has, on the secondary side (smoothing circuit side), a secondary side first coil (S21). The primary side first coil (S11) is repeatedly made conductive/non-conductive by the on/off of the transistor (66), whereby a boosted, amplitude-increased voltage is generated in the secondary side first coil (S21). On the other hand, in the primary side second coil (S12), an induced voltage depending on the secondary side voltage is generated, and the induced voltage is detected by an output voltage detecting part (69). The output voltage detecting part (69) is configured, such that it sends out an abnormal signal to the controller (64), for example, when the secondary side output voltage is abnormal.

The smoothing circuit (68) is formed by, for example, a Cockcroft circuit which is a capacitor/diode combination. The smoothing circuit (68) is configured, such that it smoothens a voltage boosted and amplified in the secondary side first coil (S21) of the transfer part (67) and applies a cyclically varying voltage to both the electrodes (41, 42) of the discharge device (40).

Figure 7:
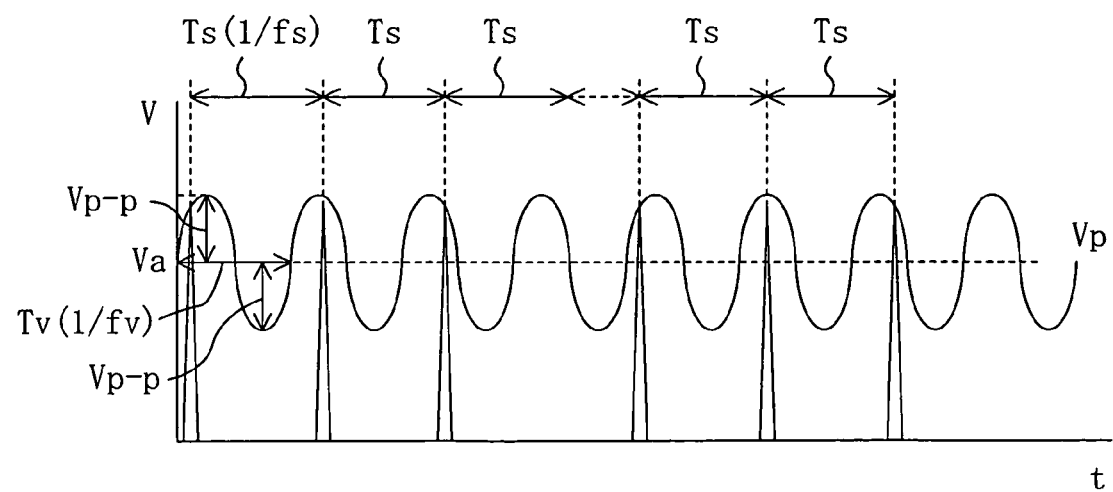
FIG. 7 is a graph example which represents a discharge frequency versus voltage frequency relationship.

In the present embodiment, the output waveform of a voltage which is applied to both the electrodes (41, 42) is in the form of a sinusoidal wave, as shown in FIG. 7. The cycle of this voltage (the voltage cycle (Tv)) is equal to or lower than the cycle of a pulsing streamer discharge (the discharge cycle (Ts)). That is, the frequency of a voltage which is applied to both electrodes (41, 42) (the voltage frequency (fv)) is equal to or higher than the frequency of a pulsing streamer discharge (the discharge frequency (fs)).

In addition, the relationship of the voltage frequency (fv) [kHz] with the gap length (G)[mm] is: $(fv)[kHz] \geq k/(G)$ [mm], where k is the experimentally found coefficient and k=40 [mm/kHz]. In the present embodiment, the voltage frequency (fv) is equal to or higher than 8.4[kHz]. Furthermore, the amplitude of the voltage (Vp-p) is equal to or lower than 10% of the average voltage (Va) which is outputted from the electric power supply means (45). In the present embodiment, the average voltage (Va) is 4.0[kV] and the voltage amplitude (Vp-p) is equal to or lower than 0.4[kV].

Running Operation

In the following, the running operation of the air purification device (10) is described.

As shown in FIG. 1 and FIG. 2, when the air purification device (10) is in operation, the centrifugal air blower (26) is activated whereby room air flows through the air passageway (25) in the casing (20). In addition, in this state, the electric power supply means (45) (FIG. 4) applies a voltage to the ionization part (32) and to the discharge device (40). At this time, a voltage in the form of a sinusoidal wave (FIG. 7) is applied to the discharge device (40).

When a stream of room air is introduced into the casing (20), dust of relatively large size is first removed by the pre-filter (31). The room air passes through the ionization part (32), during which dust of relatively small size in the room air is electrically charged, and flows downstream, and the dust thus electrically charged is entrapped and collected by the electrostatic filter (33). As described above, airborne dust particles of large size and small size are almost removed by the pre-filter (31) and by the electrostatic filter (33).

In the discharge device (40) integrally incorporated into the ionization part (32), a low temperature plasma is generated from the tip of the discharge electrode (41) towards the counter electrode (42) (FIG. 3) and, as a result, activated species of high reactivity such as electron, ion, ozone, and radical et cetera are produced. When these activated species arrive at the catalytic filter (34), they become further activated, thereby decomposing and removing harmful components and odorous components in the air. And, clean room air, free from dust as well as from harmful and odorous substances, is blown out into the room through the air blowout opening (24).

EFFECTS OF THE EMBODIMENT

The air purification device (10) of the present embodiment provides the following advantageous effects.

Figure 6:
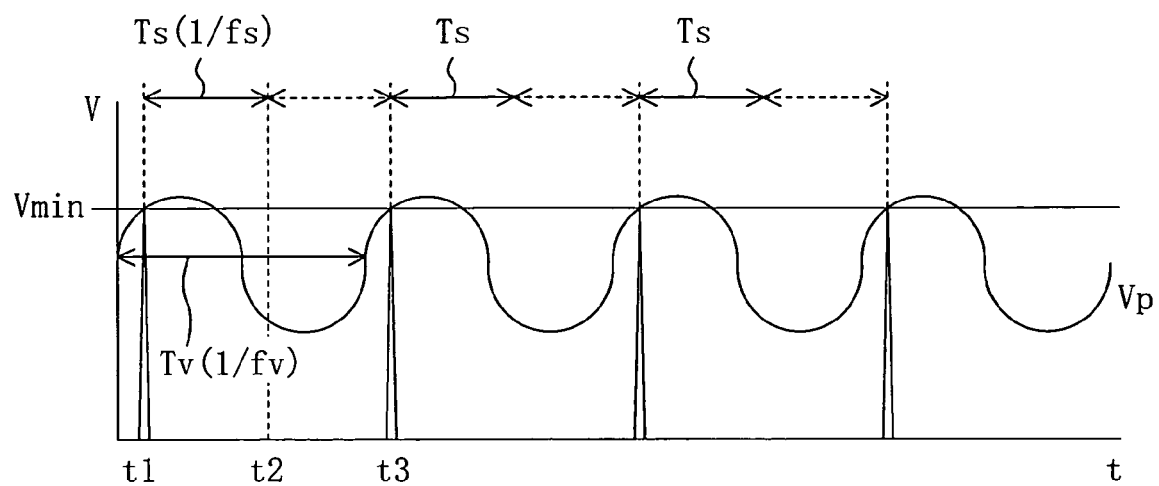
FIG. 6 is a graph example which represents a discharge frequency versus voltage frequency relationship.

In the present embodiment, the voltage frequency (fv) is made equal to or higher than the discharge frequency (fs). Consequently, in comparison with, for example, the case where the voltage frequency (fv) falls below the discharge frequency (fs) (FIG. 6), the discharge delay time (period indicated by dashed arrow in FIG. 7) at the time of streamer discharge can be made shorter.

Figure 8:
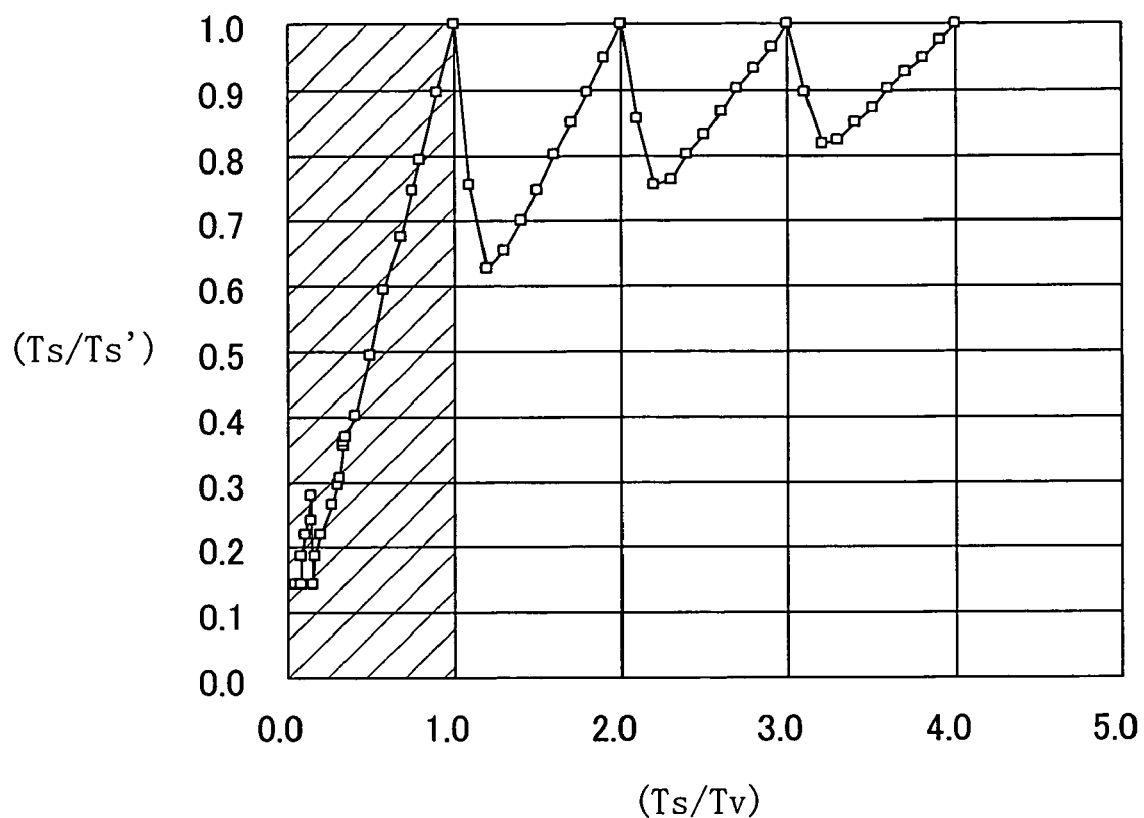
FIG. 8 shows a simulation result derived by examining how the relationship between discharge frequency and voltage frequency affects the discharge delay time.

This is explained with reference to a graph shown in FIG. 8. FIG. 8 shows a simulation result derived by examining how the discharge delay time at the time of streamer discharge varies depending on the relationship between the voltage cycle (Tv) and the discharge cycle (Ts). In FIG. 8, the abscissa axis is indicative of values obtained by dividing the discharge cycle (Ts) by the voltage cycle (Tv), while on the other hand the ordinate axis is indicative of values obtained by dividing the discharge cycle (Ts) by the real discharge cycle (Ts'). Here, the discharge cycle (Ts) is the minimum required cycle at the time of streamer discharge and the real discharge cycle (Ts') is the cycle which is required at the time of actual streamer discharge and is obtained by simulation. Accordingly, FIG. 8 shows that as (Ts/Ts') on the ordinate axis approaches a value of 1.0, the discharge delay time decreases. Conversely, as (Ts/Ts') on the ordinate axis approaches a value of 0, the discharge delay time increases.

In the simulation result, as shown in a shaded range of FIG. 8, (Ts/Tv)<1, in other words, it turns out that if the voltage cycle (Tv) becomes greater than the discharge cycle (Ts) the discharge delay time tends to significantly increase. Consequently, the discharge losses of the discharge device (40) increase. On the other hand, if (Ts/Tv)$\geq$1 in FIG. 8, i.e. if the voltage cycle (Tv) becomes equal to or less than the discharge cycle (Ts), the discharge delay time becomes relatively short. In other words, if the voltage frequency (fv) is made equal to or higher than the discharge frequency (fs), this reduces the discharge delay time, thereby making it possible to effectively reduce the discharge losses of the discharge device (40).

In addition, in the present embodiment, the electric power supply means (45) is configured so as to be capable of application of a voltage which satisfies the relational expression: $(fv) \geq 40/(G)$. Here, this relational expression is described with reference to a graph of FIG. 9.

Figure 9:
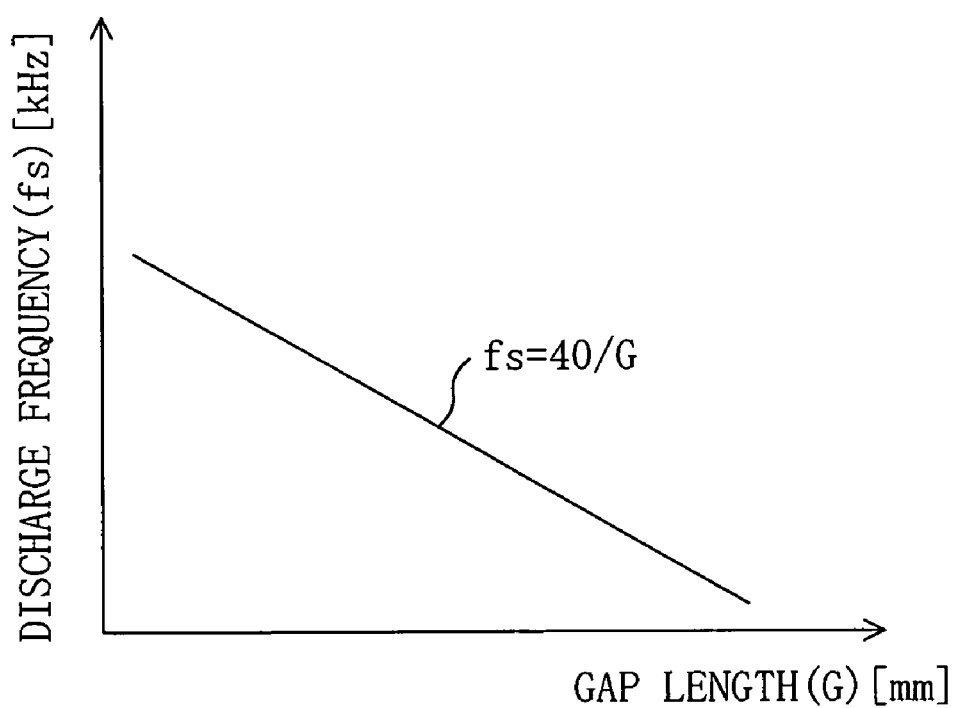
FIG. 9 is a graph which represents a gap length versus discharge frequency relationship.

As described above, a pulsing streamer discharge is generated due to the lingering charged particle (52). Therefore, the streamer discharge frequency (fs) is roughly governed by the time for which the charged particle (52) lingers. FIG. 9 shows a graph which represents an experimentally found relationship between the gap length (G) and the discharge frequency (fs). The graph shows that, within the range where the streamer discharge is produced, the discharge frequency (fs) is roughly a linear function of the gap length (G), and the relationship is: fs=40/G.

In the present embodiment, the discharge frequency (fs) is estimated from the above relational expression and the voltage frequency (fv) is determined based on the estimated discharge frequency (fs), thereby ensuring that the voltage frequency (fv) is made equal to or higher than the discharge frequency (fs). As a result, the discharge losses of the discharge device (40) can be reduced without failing.

Furthermore, in the present embodiment, the electric power supply means (45) applies to both the electrodes (41, 42) a voltage having an amplitude of (Vp-p) equal to or less than 10% of the average voltage (Va). This narrows the range of variation of the voltage which is applied to the both the electrodes (41, 42), thereby making it possible to inhibit the voltage which is applied to both the electrodes (41, 42) from reaching a spark region. Accordingly, the generation of a spark is inhibited and it becomes possible to improve the stability of producing streamer discharges in the discharge device.

Other Embodiments

With respect to the aforesaid embodiment, the present invention may be configured as follows.

In the discharge device (40) of the present embodiment, the electric power supply means (45) is configured, such that it outputs a voltage whose voltage frequency (fv) is equal to or higher than 8.4[kHz]. However, the voltage frequency (fv) is preferably equal to or higher than 20[kHz]. In this case, the discharge delay time is reduced, thereby making it possible to reduce the discharge losses of the discharge device and, in addition, the frequency of sound associated with a voltage (amplitude signal) outputted from the electric power supply means (45) is made higher than the range of human hearing, thereby suppressing noises in the vicinity of the electric power supply means (45).

In addition, in the aforesaid embodiment, it is arranged such that the electric power supply means (45) outputs a voltage whose output waveform is a sinusoidal waveform. However, the output waveform of the electric power supply means (45) may be in any waveform such as rectangular waveform, saw-tooth waveform, pulse-like waveform et cetera as long as it varies cyclically.

INDUSTRIAL APPLICABILITY

As has been described above, the present invention finds application in a discharge device adapted to cause a streamer discharge to be initiated by application of a cyclically varying voltage, and further finds application in an air purification device equipped with such a discharge device.

What is claimed is:

1. A discharge device, which comprises a plurality of discharge electrodes and a counter electrode facing the plurality of discharge electrodes, for causing a streamer discharge to be initiated between both the electrodes by applying a cyclically varying voltage to both the electrodes from electric power supply means, wherein: the following relational expression is satisfied:

$$fv \geq fs$$

where (fv) is the frequency of the voltage which is applied to both the electrodes and (fs) is the frequency of the streamer discharge which is generated, in the form of a pulse, between both the electrodes.

2. The discharge device of claim 1, wherein:
if k=40[mm/kHz], the following relational expression is satisfied:

$$fv \geq k/G$$

where (fv)[kHz] is the frequency of the voltage which is applied to both the electrodes and (G)[mm] is the distance between both the electrodes.

3. The discharge device of claim 1 or claim 2, wherein:
the following relational expression is satisfied:

$$fv \geq 20[kHz]$$

where (fv)[kHz] is the frequency of the voltage which is applied to both the electrodes.

4. The discharge device of claim 1, wherein:
the following relational expression is satisfied:

$$Vp\text{-}p \geq 0.1 \times Va$$

where (Va) and (Vp-p) are, respectively, the average voltage and the amplitude for the voltage which is applied to both the electrodes.

5. An air purification device, which comprises a discharge device according to claim 1 for causing a streamer discharged to be initiated between a discharge electrode and a counter electrode, for purifying air to be treated by distributing the air to be treated between both the electrodes.

* * * * *